Patented June 5, 1951

2,555,634

UNITED STATES PATENT OFFICE 2,555,634

PRODUCTION OF PHOSPHATE MATERIALS

Hendrik De Bruijn, Geleen, and Mathijs H. R. J. Plusje, Beek, Netherlands, assignors to De Directie van de Staatsmijnen in Limburg, Heerlen, Netherlands No Drawing. Application September 11, 1947, Serial No. 773,512. In the Netherlands June 12, 1945

Section 1, Public Law 690, August 8, 1946
Patent expires June 12, 1965

4 Claims. (Cl. 71—39)

This invention relates to processes for the production of new phosphate materials and, more particularly, it is concerned with the production of calcium phosphates that are insoluble in water, but soluble in ammonium citrate solution and which are useful as ingredients in fertilizers.

By far the large majority of the naturally occurring raw phosphate materials are incapable of absorption or assimilation by plant life. Consequently, the economical and efficient transformation of these naturally occurring substances into materials which may be assimilated by plant life and thus be useful as fertilizer materials is a major problem. Various procedures have been evolved for this purpose, but all of the methods known heretofore have possessed certain undesirable features, e. g., they may produce products which do not contain the entire phosphate content thereof in a state that it is completely utilizable by plant life.

A principal object of this invention is the provision of a new process for the production of phosphate materials, i. e., a new type of calcium phosphate. A further object is the provision of a calcium phosphate which is insoluble in water, but is substantially completely soluble in ammonium citrate solutions and a process for the production of such materials. Other objects are the provision of improvements in the phosphate material treatment procedures of the prior art and the provision of converted phosphate in which substantially the entire phosphate content can be utilized by plant life when applied to the plant as a fertilizer. Still further objects and the entire scope of applicability of the present invention will become apparent from the detailed description given hereinafter; it should be understood, however, that the detailed description and specific examples are given by way of illustration only and, while indicating preferred embodiments of the invention, are not given by way of limitation, since various changes and modifications within the spirit and scope of the invention will become apparent to those skilled in the art from this detailed description.

These objects are accomplished according to the present invention by treating solutions of raw phosphate material, such as those prepared by decomposition of the raw phosphates with strong mineral acids, with a precipitating reagent comprising ammonia and a substance capable of furnishing sulfite ions to the solution, e. g., sulfur dioxide a soluble sulfite or soluble bisulfite and, thereafter, recovering the precipitated calcium phosphate. Preferably, the pH of the reagent mixture during the treatment with the precipitating reagent is maintained between 6 and 8.

The success of the present invention depends to a large extent upon the discovery that if solutions containing calcium and phosphate ions are treated with ammonia and the material capable of supplying a sulfite ion to the solution, there are produced by this treatment precipitates which possess a composition similar to the natural apatites and in which the CaO and $P_2O_5$ molecular proportions are between the limits of 3.3 and 4.0. However, it has been found that there is a surprising difference between the products produced by such a procedure and the naturally occurring apatites. Thus, these new products, in contrast to the naturally occurring materials, are completely soluble in ammonium citrate solution.

The procedures and products of this invention may be more readily comprehended by reference to the following illustrative examples in which all parts are by weight.

Example I

One thousand parts of Curacao phosphate of the composition 50% CaO, 34.2% $P_2O_5$ are dissolved with 2200 parts of 53% nitric acid. This mixture is then heated to a temperature of 100° C. and is slowly poured into a quantity of liquor having a pH of 6, obtained from a preceding step in a similar operation. Ammonia and sulfur dioxide are introduced into the resulting mixture in continuously regulated fashion so that the pH of the mixture is maintained at 6. This introduction of gases is continued until 310 parts of ammonia and 215 parts of sulfur dioxide have been incorporated. A precipitate results which is 100% soluble in neutral ammonium citrate solution and which contains CaO, $P_2O_5$ and $SO_2$ in the molecular proportion of 3.7 to 1 to 0.7, respectively.

Example II

A mixture of raw phosphate material and nitrate acid is prepared as recited in Example I. This mixture is then gradually poured at a temperature of 75° C. into a quantity of liquor obtained from a preceding operation of the process having a pH of 7. At the same time, a solution of ammonium sulfite and ammonia are introduced to the mixture at such a rate that the pH of the solution is maintained constantly at 7. A total of 245 parts of ammonium sulfite and 245 parts of ammonia are incorporated. A precipitate is formed which is completely soluble in a neutral solution of ammonium citrate and which has a composition such that the CaO to $P_2O_5$ to $SO_2$ are in the molecular proportion of 3.6 to 1 to 0.6, respectively.

Fertilizing experiments carried out with the calcium phosphate products of this invention and fertilizers compounded therefrom demonstrate that the materials have most favorable characteristics, even in acid soils.

Various types of materials containing calcium and phosphates, i. e., tricalcium phosphate, in appreciable quantities may be used in carrying out the present process. Obviously, materials in which the calcium and phosphate content are high are preferred. Examples of suitable materials for this purpose are Florida pebble or plate rock phosphate, Canadian apatite, Tennessee brown rock phosphate, Curacao phosphate, Makatea phosphate, and similar natural products. Likewise, mixtures of the materials may be used or synthetically produced or by-product calcium phosphate products or mixtures thereof may be utilized. Such materials have been referred to throughout the specification and in the pending claims as raw phosphate materials.

As a preliminary step in the process, the raw phosphate material is decomposed by operation of strong acidic materials. Most suitable for this purpose are the strong mineral acids, such as sulfuric or hydrochloric acids and, particularly, nitric acid.

Proper adjustment of the pH of the solution during the final precipitation step is desirable. If the pH of the solution during the introduction of the precipitating reagent, such as ammonia and sulfur dioxide, is permitted to go below 6, a product may be obtained having somewhat less solubility than the products prepared at pH values of 6 to 8. This appears to be due to the formation of hydroxyapatite. On the other hand, if the pH during this addition is permitted to exceed 8, a precipitate may be obtained in which the CaO to $P_2O_5$ ratio is higher than in the products of this invention, apparently, because $P_2O_5$ is not precipitated at this pH.

Various substances which furnish a sulfite ion to the solution when reacted therewith, may be used as the reagents to precipitate the products of this invention. The examples above illustrate the simultaneous use of ammonia and sulfur dioxide for this purpose. Water-soluble sulfite and bisulfites may also be employed, such as ammonium sulfite, potassium sulfite, sodium bisulfite, potassium bisulfite and the like. The exact amount of these treating agents to be used in the process will depend to a large extent upon the concentration of the solutions being treated. In any event, sufficient material should be used to cause a substantial precipitation of the novel phosphates of this invention.

After the product of this invention has been precipitated, it may be separated by filtration, and the remaining mother-liquor may be concentrated to give the ammonium salt of the acid which was used for decomposing the raw phosphate. Another way of working up the liquid, containing the precipitate, consists in concentrating it as a whole, by evaporation. This method yields a concentrated, mixed fertilizer, containing the phosphate and an ammonium salt, e. g., ammonium nitrate. Also potassium salts may be added to yield a balanced fertilizer.

In the evaporation step, profit may be derived from the heat developed in neutralizing the acid. It is desirable to control the pH during the evaporation process, and to prevent its going down below 6 by adding ammonia.

We claim:

1. A process for the production of calcium phosphate-containing material which is insoluble in water but soluble in an ammonium citrate solution, which comprises the steps of, dissolving a raw calcium phosphate material with nitric acid; introducing simultaneously into a body of previously neutralized reaction mass streams of the resulting acid decomposition solution, ammonia and a material selected from the group consisting of sulfur dioxide, water-soluble sulfites and water-soluble bisulfites; adjusting the rate of addition of the decomposition solution, neutralizing agent and said material so that the pH of the reaction mass is continuously maintained between about 6 and 8, the $NH_3$ and $SO_2$ being introduced in such proportions that the precipitate formed contains CaO, $P_2O_5$ and $SO_2$ in approximately the molecular ratio of 3.7 to 1 to 0.7 respectively; and recovering the precipitated calcium phosphate material.

2. A process according to claim 1, in which the streams are introduced into a body of phosphatic liquor having a pH between about 6 and 8.

3. A process according to claim 1 in which the acid decomposition solution is introduced at a temperature in the range of 75°–100° C.

4. A process for the production of calcium phosphate-containing material which is insoluble in water but soluble in an ammonium citrate solution, which comprises the steps of: dissolving a raw calcium phosphate material with nitric acid; introducing simultaneously into a body of a liquor having a pH between about 6–8 streams of the resulting acid decomposition solution, ammonia and a material selected from the group consisting of sulfur dioxide, water-soluble sulfites and water-soluble bisulfites; adjusting the rate of addition of the decomposition solution, neutralizing agent and said material so that the pH of the reaction mass is continuously maintained between about 6 and 8, the $NH_3$ and $SO_2$ being introduced in such proportions that the precipitate formed contains CaO, $P_2O_5$ and $SO_2$ in approximately the molecular ratio of 3.7 to 1 to 0.7 respectively; and recovering the precipitated calcium phosphate material.

HENDRIK DE BRUIJN.
MATHIJS H. R. J. PLUSJE.

REFERENCES CITED

The following references are of record in the file of this patent:

UNITED STATES PATENTS

| Number | Name | Date |
|---|---|---|
| 852,371 | Bergmann | Apr. 30, 1907 |
| 1,710,272 | Richter | Apr. 23, 1929 |
| 1,857,571 | Sebastian | May 10, 1932 |
| 1,913,791 | Carothers | June 13, 1933 |
| 1,948,520 | Harvey | Feb. 27, 1934 |
| 2,237,826 | Woodhouse | Apr. 8, 1941 |

FOREIGN PATENTS

| Number | Country | Date |
|---|---|---|
| 430,380 | Great Britain | June 18, 1935 |